United States Patent
Lee et al.

(10) Patent No.: US 12,055,791 B2
(45) Date of Patent: Aug. 6, 2024

(54) WIDE-ANGLE LENS ASSEMBLY

(71) Applicants: Sintai Optical (Shenzhen) Co., Ltd., ShenZhen (CN); Asia Optical Co., Inc., Taichung (TW)

(72) Inventors: Jian-Wei Lee, Taichung (TW); Chia-Hung Sun, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 577 days.

(21) Appl. No.: 17/301,812

(22) Filed: Apr. 15, 2021

(65) Prior Publication Data

US 2021/0356697 A1  Nov. 18, 2021

(30) Foreign Application Priority Data

May 15, 2020  (CN) .......................... 202010414559.4

(51) Int. Cl.
G02B 9/64        (2006.01)
(52) U.S. Cl.
CPC ..................................... G02B 9/64 (2013.01)
(58) Field of Classification Search
CPC ........................................................ G02B 9/64
USPC ........................................................ 359/754
See application file for complete search history.

(56) References Cited

U.S. PATENT DOCUMENTS

2015/0192839 A1* 7/2015 Miyazaki ................. G02B 9/64
                                                          348/360
2016/0170175 A1* 6/2016 Chang ................ G02B 13/0045
                                                          359/708
2017/0010437 A1* 1/2017 Asami .................. G02B 15/142

FOREIGN PATENT DOCUMENTS

| CN | 104076490 A |   | 10/2014 |
| CN | 109725406 A | * | 5/2019 |
| CN | 109725406 A |   | 5/2019 |
| JP | 2000066092 A |  | 3/2000 |
| JP | 2010097207 A |  | 4/2010 |
| TW | 201437672 A |   | 10/2014 |
| TW | I693445 B |     | 5/2020 |

OTHER PUBLICATIONS

CN-109725406A English translation—Dai—May 5, 2019—China.*

* cited by examiner

*Primary Examiner* — Sharrief I Broome
(74) *Attorney, Agent, or Firm* — McClure, Qualey & Rodack, LLP

(57) ABSTRACT

A wide-angle lens assembly includes a first, second, third, fourth, fifth, sixth, seventh, eighth, ninth, and tenth lenses. The first and second lenses are meniscus lenses with negative refractive power. The third and seventh lenses are with negative refractive power. The sixth and tenth lenses are with positive refractive power. The fourth lens is a meniscus lens with positive refractive power. The fifth lens includes a convex surface facing an object side. The eighth lens includes a convex surface facing the object side. The ninth lens includes a concave surface facing the object side and a convex surface facing an image side. The first, second, third, fourth, fifth, sixth, seventh, eighth, ninth, and tenth lenses are arranged in order from the object side to the image side along an optical axis.

17 Claims, 15 Drawing Sheets

```
+  0.4500μm    ✻  0.6000μm
×  0.5000μm    ⋈  0.6500μm
▫  0.5500μm    Spot Diagram
```

IMA : 0.000mm
RMS radius : 0.763μm
GEO radius : 1.397μm

IMA : 4.378mm
RMS radius : 1.737μm
GEO radius : 4.570μm

IMA : 6.566mm
RMS radius : 1.199μm
GEO radius : 4.222μm

IMA : 7.892mm
RMS radius : 2.042μm
GEO radius : 5.491μm

WIDE-ANGLE LENS ASSEMBLY

BACKGROUND OF THE INVENTION

Field of the Invention

The invention relates to a wide-angle lens assembly.

Description of the Related Art

The current development trend of a wide-angle lens assembly is toward large field of view. Additionally, the wide-angle lens assembly is developed to have high resolution and resistance to environmental temperature change in accordance with different application requirements. However, the known wide-angle lens assembly can't satisfy such requirements. Therefore, the wide-angle lens assembly needs a new structure in order to meet the requirements of large field of view, high resolution, and resistance to environmental temperature change at the same time.

BRIEF SUMMARY OF THE INVENTION

The invention provides a wide-angle lens assembly to solve the above problems. The wide-angle lens assembly of the invention is provided with characteristics of an increased field of view, an increased resolution, a resisted environmental temperature change, and still has a good optical performance.

The wide-angle lens assembly in accordance with an exemplary embodiment of the invention includes a first lens, a second lens, a third lens, a fourth lens, a fifth lens, a sixth lens, a seventh lens, an eighth lens, a ninth lens, and a tenth lens, all of which are arranged in order from an object side to an image side along an optical axis. The first lens is a meniscus lens with negative refractive power. The second lens is a meniscus lens with negative refractive power. The third lens is with negative refractive power. The fourth lens is a meniscus lens with positive refractive power. The fifth lens is with refractive power and includes a convex surface facing the object side. The sixth lens is with positive refractive power. The seventh lens is with negative refractive power. The eighth lens is with refractive power and includes a convex surface facing the object side. The ninth lens is with refractive power and includes a concave surface facing the object side and a convex surface facing the image side. The tenth lens is with positive refractive power.

The wide-angle lens assembly in accordance with another exemplary embodiment of the invention includes a first lens, a second lens, a third lens, a fourth lens, a fifth lens, a sixth lens, a seventh lens, an eighth lens, a ninth lens, and a tenth lens, all of which are arranged in order from an object side to an image side along an optical axis. The first lens is a meniscus lens with negative refractive power. The second lens is a meniscus lens with negative refractive power. The third lens is with negative refractive power. The fourth lens is a meniscus lens with positive refractive power. The fifth lens is with refractive power and includes a convex surface facing the object side. The sixth lens is with positive refractive power. The seventh lens is with refractive power and includes a convex surface facing the object side and a concave surface facing the image side. The eighth lens is with refractive power and includes a convex surface facing the object side. The ninth lens is with refractive power and includes a concave surface facing the object side and a convex surface facing the image side. The tenth lens is with positive refractive power. An air gap is disposed between the third lens and the fourth lens.

In another exemplary embodiment, the eighth lens is with positive refractive power and is composed of a cemented lens of an eighth front lens and an eighth rear lens, the eighth front lens is a biconvex lens with positive refractive power, the eighth rear lens is a meniscus lens with negative refractive power and includes a concave surface facing the object side and a convex surface facing the image side, and the eighth front lens and the eighth rear lens are arranged in order from the object side to the image side along the optical axis.

In yet another exemplary embodiment, the first lens includes a convex surface facing the object side and a concave surface facing the image side, the third lens includes a concave surface facing the object side and another concave surface facing the image side, the fifth lens is with positive refractive power and further includes a concave surface facing the image side, the seventh lens includes a convex surface facing the object side and a concave surface facing the image side, the eighth lens is with positive refractive power, the ninth lens is with negative refractive power, and the tenth lens includes a convex surface facing the object side and another convex surface facing the image side.

In another exemplary embodiment, the wide-angle lens assembly satisfies at least one of the following conditions: 14.5≤TTL/f≤16.5; 9≤TTL/BFL≤11; 6≤f$_4$/f≤8; 6≤|f$_7$/f|≤8; wherein TTL is an interval from an object side surface of the first lens to an image plane along the optical axis, BFL is an interval from an image side surface of the tenth lens to the image plane along the optical axis, f is an effective focal length of the wide-angle lens assembly, f$_4$ is an effective focal length of the fourth lens, and f$_7$ is an effective focal length of the seventh lens.

In yet another exemplary embodiment, the ninth lens is with negative refractive power and is composed of a cemented lens of a ninth front lens and a ninth rear lens, the ninth front lens is a biconcave lens with negative refractive power, the ninth rear lens is a biconvex lens with positive refractive power, and the ninth front lens and the ninth rear lens are arranged in order from the object side to the image side along the optical axis.

In another exemplary embodiment, the first lens includes a convex surface facing the object side and a concave surface facing the image side, the second lens includes a convex surface facing the object side and a concave surface facing the image side, the third lens includes a concave surface facing the object side and a plane surface facing the image side, the fourth lens includes a concave surface facing the object side and a convex surface facing the image side, the fifth lens further includes a convex surface facing the image side, the sixth lens includes a convex surface facing the object side and another convex surface facing the image side, the seventh lens includes a convex surface facing the object side and a concave surface facing the image side, the eighth lens further includes a convex surface facing the image side, and the tenth lens includes a convex surface facing the object side and another convex surface facing the image side.

In yet another exemplary embodiment, the third lens includes a concave surface facing the object side and another concave surface facing the image side and the fifth lens further includes a concave surface facing the image side.

In another exemplary embodiment, the third lens includes a concave surface facing the object side and a plane surface facing the image side and the fifth lens further includes a convex surface facing the image side.

In yet another exemplary embodiment, the first lens includes a convex surface facing the object side and a concave surface facing the image side, the seventh lens includes a convex surface facing the object side and a concave surface facing the image side, and the tenth lens includes a convex surface facing the object side and another convex surface facing the image side.

In another exemplary embodiment, the second lens includes a convex surface facing the object side and a concave surface facing the image side, the fourth lens further includes a concave surface facing the object side and a convex surface facing the image side, the sixth lens includes a convex surface facing the object side and another convex surface facing the image side, and the eighth lens further includes a convex surface facing the image side.

In yet another exemplary embodiment, the fifth lens is with positive refractive power; the eighth lens is with positive refractive power, and the ninth lens is with negative refractive power.

In another exemplary embodiment, the wide-angle lens assembly further includes a stop disposed between the sixth lens and the seventh lens.

In yet another exemplary embodiment, the wide-angle lens assembly further includes a stop disposed between the sixth lens and the seventh lens and satisfies at least one of the following conditions: $14.5 \leq TTL/f \leq 16.5$; $9 \leq TTL/BFL \leq 11$; $6 \leq f_4/f \leq 8$; $6 \leq |f_7/f| \leq 8$; wherein TTL is an interval from an object side surface of the first lens to an image plane along the optical axis, BFL is an interval from an image side surface of the tenth lens to the image plane along the optical axis, f is an effective focal length of the wide-angle lens assembly, $f_4$ is an effective focal length of the fourth lens, and $f_7$ is an effective focal length of the seventh lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

The present invention provides a wide-angle lens assembly including a first lens, a second lens, a third lens, a fourth lens, a fifth lens, a sixth lens, a seventh lens, an eighth lens, a ninth lens, and a tenth lens. The first lens is a meniscus lens with negative refractive power. The second lens is a meniscus lens with negative refractive power. The third lens is with negative refractive power. The fourth lens is a meniscus lens with positive refractive power. The fifth lens is with refractive power and includes a convex surface facing an object side. The sixth lens is with positive refractive power. The seventh lens is with negative refractive power. The eighth lens is with refractive power and includes a convex surface facing the object side. The ninth lens is with refractive power and includes a concave surface facing the object side and a convex surface facing an image side. The tenth lens is with positive refractive power. The first lens, the second lens, the third lens, the fourth lens, the fifth lens, the sixth lens, the seventh lens, the eighth lens, the ninth lens, and the tenth lens are arranged in order from the object side to the image side along an optical axis.

The present invention provides another wide-angle lens assembly including a first lens, a second lens, a third lens, a fourth lens, a fifth lens, a sixth lens, a seventh lens, an eighth lens, a ninth lens, and a tenth lens. The first lens is a meniscus lens with negative refractive power. The second lens is a meniscus lens with negative refractive power. The third lens is with negative refractive power. The fourth lens is a meniscus lens with positive refractive power. The fifth lens is with refractive power and includes a convex surface facing an object side. The sixth lens is with positive refractive power. The seventh lens is with refractive power and includes a convex surface facing the object side and a concave surface facing an image side. The eighth lens is with refractive power and includes a convex surface facing the object side. The ninth lens is with refractive power and includes a concave surface facing the object side and a convex surface facing the image side. The tenth lens is with positive refractive power. The first lens, the second lens, the third lens, the fourth lens, the fifth lens, the sixth lens, the seventh lens, the eighth lens, the ninth lens, and the tenth lens are arranged in order from the object side to the image side along an optical axis. An air gap is disposed between the third lens and the fourth lens.

Referring to Table 1, Table 3, and Table 5, wherein Table 1, Table 3, and Table 5 show optical specification in accordance with a first, second, and third embodiments of the invention respectively.

Figure 1:
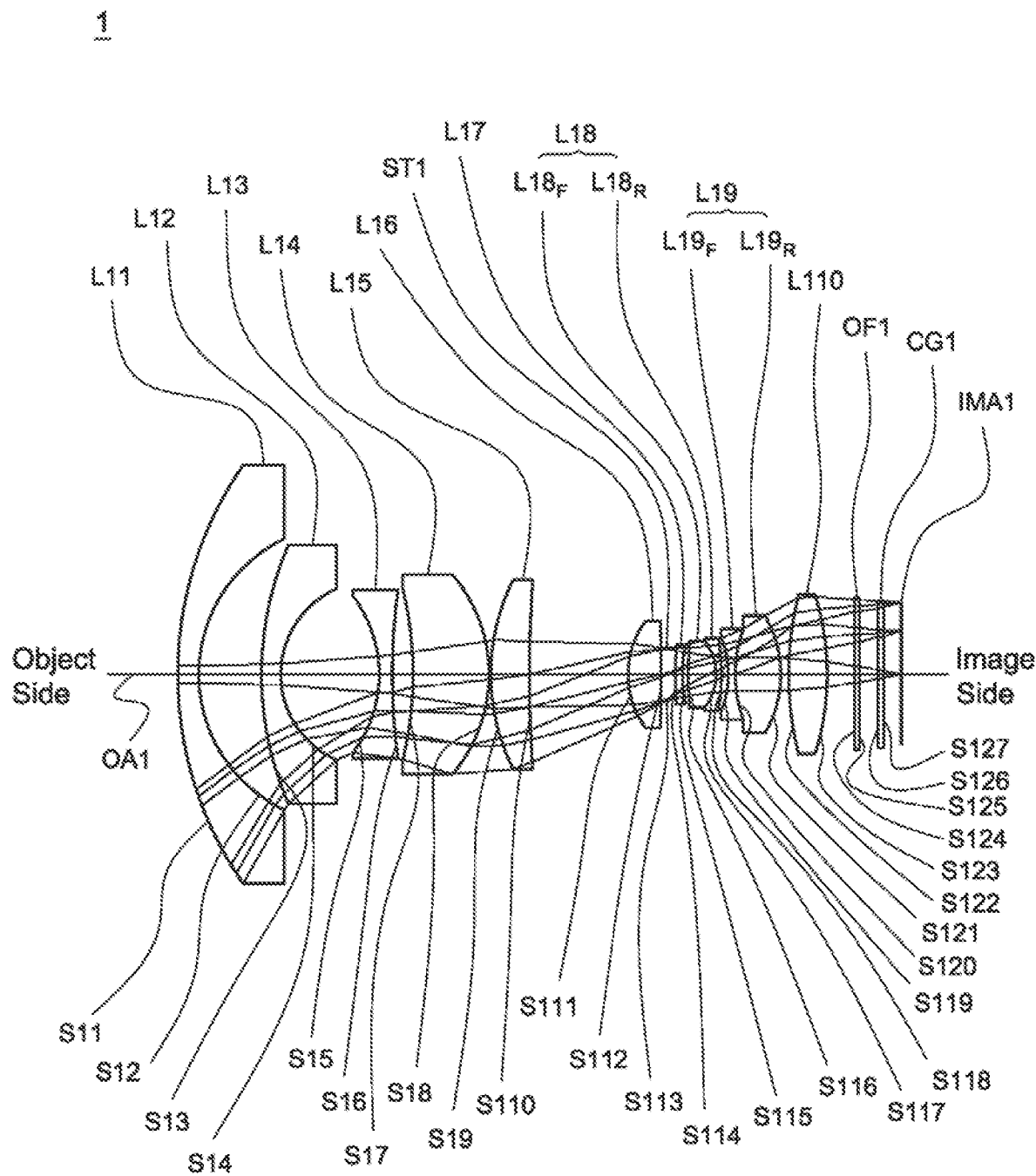
FIG. 1 is a lens layout and optical path diagram of a wide-angle lens assembly in accordance with a first embodiment of the invention.
Figure 3:
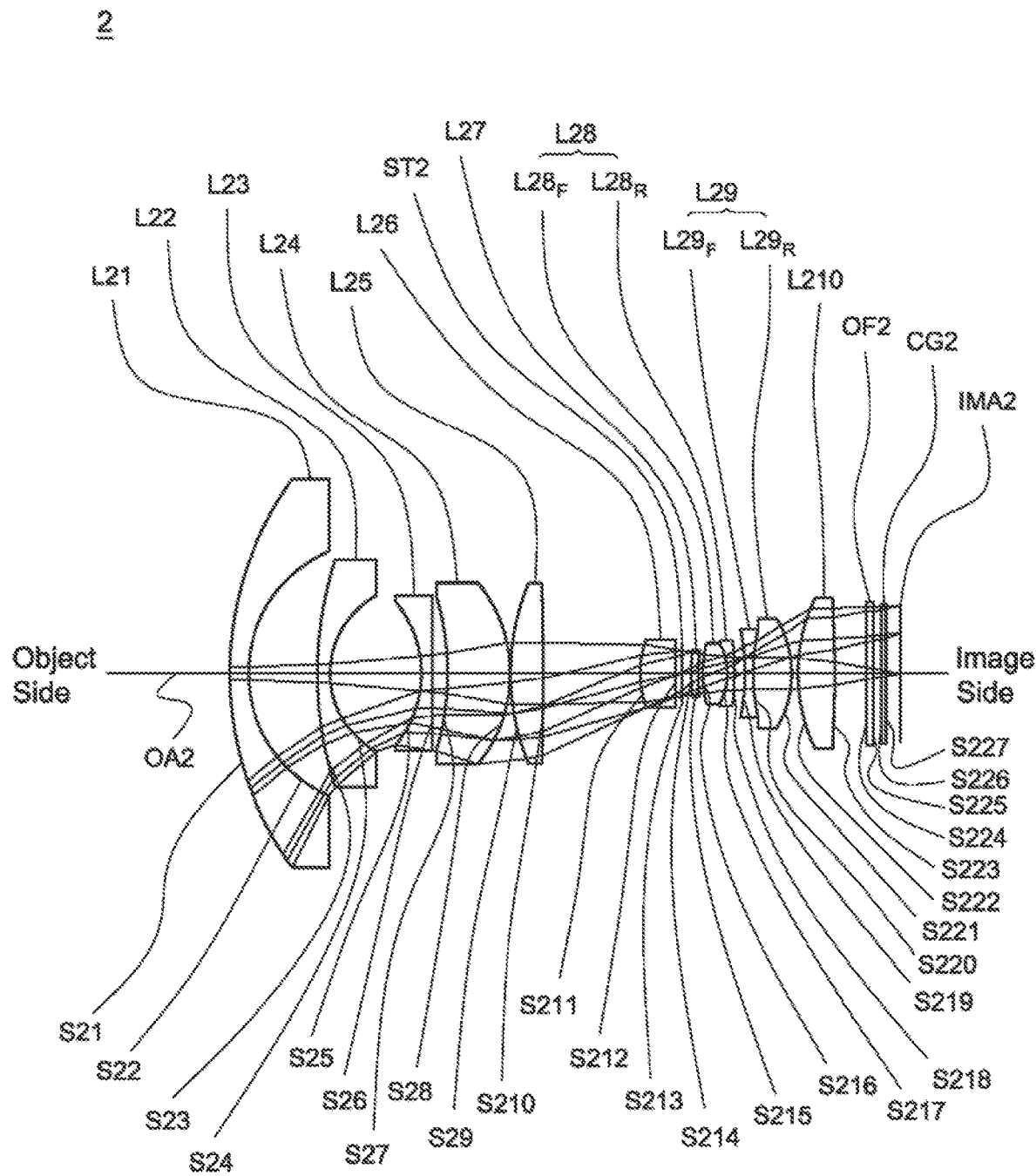
FIG. 3 is a lens layout and optical path diagram of a wide-angle lens assembly in accordance with a second embodiment of the invention.
Figure 5:
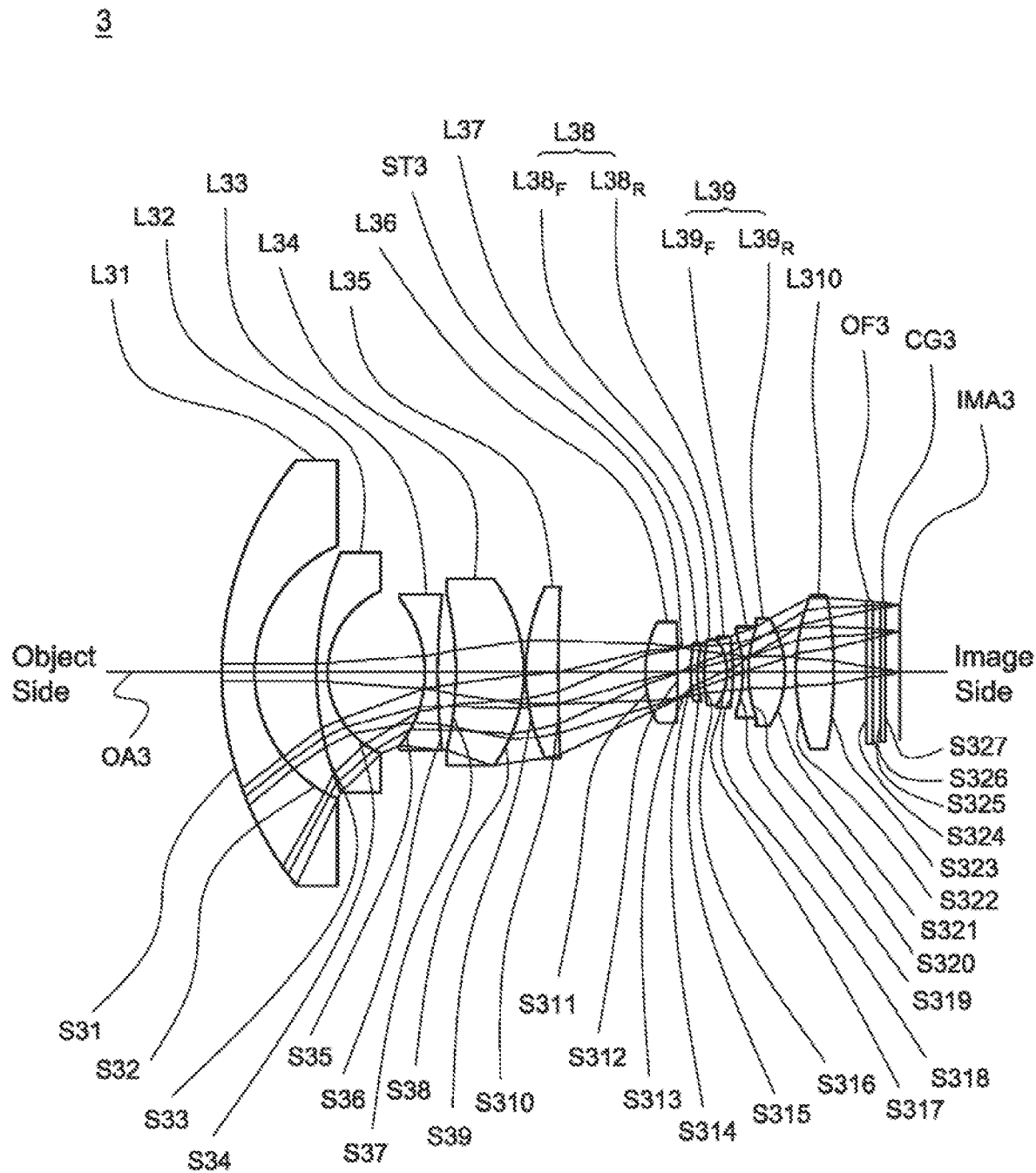
FIG. 5 is a lens layout and optical path diagram of a wide-angle lens assembly in accordance with a third embodiment of the invention.

FIG. 1, FIG. 3, and FIG. 5 are lens layout and optical path diagrams of the wide-angle lens assembly in accordance with the first, second, and third embodiments of the invention respectively.

The first lens L11, L21, L31 are meniscus lenses with negative refractive power and made of glass material, wherein the object side surfaces S11, S21, S31 are convex surfaces, the image side surfaces S12, S22, S32 are concave surfaces, and the object side surfaces S11, S21, S31 and the image side surfaces S12, S22, S32 are spherical surfaces.

The second lens L12, L22, L32 are meniscus lenses with negative refractive power and made of glass material, wherein the object side surfaces S13, S23, S33 are convex surfaces, the image side surfaces S14, S24, S34 are concave surfaces, and the object side surfaces S13, S23, S33 and the image side surfaces S14, S24, S34 are spherical surfaces.

The third lens L13, L23, L33 are with negative refractive power and made of glass material, wherein the object side surfaces S15, S25, S35 are concave surfaces and the object side surfaces S15, S25, S35 are spherical surfaces.

The fourth lens L14, L24, L34 are meniscus lenses with positive refractive power and made of glass material, wherein the object side surfaces S17, S27, S37 are concave surfaces, the image side surfaces S18, S28, S38 are convex surfaces, and the object side surfaces S17, S27, S37 and the image side surfaces S18, S28, S38 are spherical surfaces.

The fifth lens L15, L25, L35 are with positive refractive power and made of glass material, wherein the object side surfaces S19, S29, S39 are convex surfaces and the object side surfaces S19, S29, S39 and the image side surfaces S110, S210, S310 are spherical surfaces.

The sixth lens L16, L26, L36 are biconvex lenses with positive refractive power and made of glass material, wherein the object side surfaces S111, S211, S311 are convex surfaces, the image side surfaces S112, S212, S312 are convex surfaces, and the object side surfaces S111, S211, S311 and the image side surfaces S112, S212, S312 are spherical surfaces.

The seventh lens L17, L27, L37 are meniscus lenses with negative refractive power and made of glass material, wherein the object side surfaces S114, S214, S314 are convex surfaces, the image side surfaces S115, S215, S315 are concave surfaces, and the object side surfaces S114, S214, S314 and the image side surfaces S115, S215, S315 are spherical surfaces.

The eighth lens L18, L28, L38 are cemented lenses with positive refractive power and made of glass material, wherein the object side surfaces S116, S216, S316 are convex surfaces, the image side surfaces S118, S218, S318 are convex surfaces, and the object side surfaces S116, S216, S316 and the image side surfaces S118, S218, S318 are spherical surfaces. The eighth lens L18, L28, L38 are cemented by the eighth front lens L18$_F$, L28$_F$, L38$_F$ and the eighth rear lens L18$_R$, L28$_R$, L38$_R$ respectively. The eighth front lens L18$_F$, L28$_F$, L38$_F$ are biconvex lenses with positive refractive power and made of glass material, wherein the object side surfaces S116, S216, S316 are convex surfaces, the image side surfaces S117, S217, S317 are convex surfaces, and the object side surfaces S116, S216, S316 and the image side surfaces S117, S217, S317 are spherical surfaces. The eighth rear lens L18$_R$, L28$_R$, L38$_R$ are meniscus lenses with negative refractive power and made of glass material, wherein the object side surfaces S117, S217, S317 are concave surfaces, the image side surfaces S118, S218, S318 are convex surfaces, and the object side surfaces S117, S217, S317 and the image side surfaces S118, S218, S318 are spherical surfaces.

The ninth lens L19, L29, L39 are cemented lenses with negative refractive power and made of glass material, wherein the object side surfaces S119, S219, S319 are concave surfaces, the image side surfaces S121, S221, S321 are convex surfaces, and the object side surfaces S119, S219, S319 and the image side surfaces S121, S221, S321 are spherical surfaces. The ninth lens L19, L29, L39 are cemented by the ninth front lens L19$_F$, L29$_F$, L3$^{9F}$ and the ninth rear lens L19$_R$, L29$_R$, L39$_R$ respectively. The ninth front lens L19$_F$, L29$_F$, L39$_F$ are biconcave lenses with negative refractive power and made of glass material, wherein the object side surfaces S119, S219, S319 are concave surfaces, the image side surfaces S120, S220, S320 are concave surfaces, and the object side surfaces S119, S219, S319 and the image side surfaces S120, S220, S320 are spherical surfaces. The ninth rear lens L19$_R$, L29$_R$, L39$_R$ are biconvex lenses with positive refractive power and made of glass material, wherein the object side surfaces S120, S220, S320 are convex surfaces, the image side surfaces S121, S221, S321 are convex surfaces, and the object side surfaces S120, S220, S320 and the image side surfaces S121, S221, S321 are spherical surfaces.

The tenth lens L110, L210, L310 are biconvex lenses with positive refractive power and made of glass material, wherein the object side surfaces S122, S222, S322 are convex surfaces, the image side surfaces S123, S223, S323 are convex surfaces, and the object side surfaces S122, S222, S322 and the image side surfaces S123, S223, S323 are spherical surfaces.

In addition, the wide-angle lens assemblies 1, 2, 3 satisfy at least one of the following conditions:

$$14.5 \leq TTL/f \leq 16.5; \tag{1}$$

$$9 \leq TTL/BFL \leq 11; \tag{2}$$

$$6 \leq f_4/f \leq 8; \tag{3}$$

$$6 \leq |f_7|/f \leq 8; \tag{4}$$

wherein TTL is an interval from the object side surfaces S11, S21, S31 of the first lenses L11, L21, L31 to the image planes IMA1, IMA2, IMA3 along the optical axes OA1, OA2, OA3 respectively for the first to third embodiments, BFL is an interval from the image side surfaces S123, S223, S323 of the tenth lenses L110, L210, L310 to the image planes IMA1, IMA2, IMA3 along the optical axes OA1, OA2, OA3 respectively for the first to third embodiments, f is an effective focal length of the wide-angle lens assemblies 1, 2, 3 for the first to third embodiments, $f_4$ is an effective focal length of the fourth lenses L14, L24, L34 for the first to third embodiments, and $f_7$ is an effective focal length of the seventh lenses L17, L27, L37 for the first to third embodiments. With the wide-angle lens assemblies 1, 2, 3 satisfying at least one of the above conditions (1)-(4), the field of view can be effectively increased, the resolution can be effectively increased, the environmental temperature change can be effectively resisted, the aberration can be effectively corrected, and the chromatic aberration can be effectively corrected.

When the condition (3): $6 \leq f_4/f \leq 8$ is satisfied, the refractive power of the fourth lens can be distributed effectively, ensures the refractive power of the fourth lens is not too large, and reduces system sensitivity and aberration effectively.

When the condition (4): $6 \leq |f_7/f| \leq 8$ is satisfied, the distortion of the wide-angle lens assembly can be balanced by equipped a meniscus shaped seventh lens with negative refractive power.

When the first lens is a meniscus lens, a large amount of light can be collected to achieve the function of a large field of view.

When the second lens is a meniscus lens, it can further assist the first lens to collect light.

When the third lens is a biconcave lens, the aberration caused by the light collection of the first lens and the second lens can be balanced.

When the fourth lens, the fifth lens and the sixth lens are with positive refractive power which can balance the negative refractive power of the first lens, the second lens and the third lens to correct aberration.

Two consecutive cemented lenses (the eighth lens and the ninth lens) are disposed on the image side of the stop which eliminates axial and lateral chromatic aberration effectively and increases the resolution of the wide-angle lens assembly.

The tenth lens can adjust field curvature and incident angle of the light for the wide-angle lens assembly.

A detailed description of a wide-angle lens assembly in accordance with a first embodiment of the invention is as follows. Referring to FIG. 1, the wide-angle lens assembly 1 includes a first lens L11, a second lens L12, a third lens L13, a fourth lens L14, a fifth lens L15, a sixth lens L16, a stop ST1, a seventh lens L17, an eighth lens L18, a ninth lens L19, a tenth lens L110, an optical filter OF1, and a cover glass CG1, all of which are arranged in order from an object side to an image side along an optical axis OA1. The eighth lens L18 is cemented by an eighth front lens L18$_F$ and an eighth rear lens L18$_R$. The ninth lens L19 is cemented by a ninth front lens L19$_F$ and a ninth rear lens L19$_R$. In operation, an image of light rays from the object side is formed at an image plane IMA1.

According to the foregoing paragraphs, wherein: the third lens is a biconcave lens, wherein the image side surface S16 is a concave surface and the image side surface S16 is a spherical surface; the fifth lens is a meniscus lens, wherein the image side surface S110 is a concave surface and the image side surface S110 is a spherical surface; both of the object side surface S124 and image side surface S125 of the optical filter OF1 are plane surfaces; and both of the object side surface S126 and image side surface S127 of the cover glass CG1 are plane surfaces.

With the above design of the lenses and stop ST1 and at least any one of the conditions (1)-(4) satisfied, the wide-angle lens assembly 1 can have an effective increased field of view, an effective increased resolution, an effective resisted environmental temperature change, an effective corrected aberration, and is capable of an effective corrected chromatic aberration.

Table 1 shows the optical specification of the wide-angle lens assembly 1 in FIG. 1.

TABLE 1

Effective Focal Length = 5.157 mm F-number = 2.8
Total Lens Length = 79.96 mm Field of View = 87.89 degrees

| Surface Number | Radius of Curvature (mm) | Thickness (mm) | Nd | Vd | Effective Focal Length (mm) | Remark |
|---|---|---|---|---|---|---|
| S11 | 41.010 | 2.145 | 1.79 | 47.37 | −36.38 | The First Lens L11 |
| S12 | 16.528 | 7.065 | | | | |
| S13 | 35.959 | 2.129 | 1.74 | 49.34 | −20.45 | The Second Lens L12 |
| S14 | 10.446 | 10.939 | | | | |
| S15 | −13.894 | 1.319 | 1.69 | 50.81 | −16.5 | The Third Lens L13 |
| S16 | 69.298 | 2.279 | | | | |
| S17 | −43.684 | 8.529 | 1.73 | 51.47 | 33.23 | The Fourth Lens L14 |
| S18 | 16.995 | 0.147 | | | | |
| S19 | 23.529 | 4.204 | 1.80 | 29.84 | 34.62 | The Fifth Lens L15 |
| S110 | 138.253 | 11.096 | | | | |
| S111 | 10.732 | 3.611 | 1.50 | 81.55 | 19.77 | The Sixth Lens L16 |
| S112 | −106.719 | 0.590 | | | | |
| S113 | ∞ | 0.890 | | | | Stop ST1 |
| S114 | 14.819 | 0.717 | 1.80 | 29.84 | −39.65 | The Seventh Lens L17 |
| S115 | 9.904 | 0.736 | | | | |
| S116 | 25.218 | 3.109 | 1.56 | 60.67 | 9.57 | The Eighth Lens L18 The Eighth Front Lens L18$_F$ |
| S117 | −6.594 | 0.568 | 1.85 | 23.79 | −11.49 | The Eighth Rear Lens L18$_R$ |
| S118 | −20.866 | 0.832 | | | | |
| S119 | −11.493 | 0.658 | 1.81 | 25.48 | −7.62 | The Ninth Lens L19 The Ninth Front Lens L19$_F$ |
| S120 | 13.757 | 5.112 | 1.50 | 81.55 | 13.73 | The Ninth Rear Lens L19$_R$ |
| S121 | −11.935 | 0.794 | | | | |
| S122 | 33.392 | 4.302 | 1.92 | 18.90 | 17.14 | The Tenth Lens L110 |
| S123 | −28.791 | 2.992 | | | | |
| S124 | ∞ | 0.7 | 1.52 | 64.17 | | Optical Filter OF1 |
| S125 | ∞ | 2 | | | | |
| S126 | ∞ | 0.5 | 1.52 | 64.17 | | Cover Glass CG1 |
| S127 | ∞ | 2 | | | | |

Table 2 shows the parameters and condition values for conditions (1)-(4) in accordance with the first embodiment of the invention. It can be seen from Table 2 that the wide-angle lens assembly 1 of the first embodiment satisfies the conditions (1)-(4).

TABLE 2

| BFL | 8.192 mm | TTL/f | 15.51 | TTL/BFL | 9.76 |
|---|---|---|---|---|---|
| $f_4/f$ | 6.44 | $|f_7/f|$ | 7.69 | | |

By the above arrangements of the lenses and stop ST1, the wide-angle lens assembly 1 of the first embodiment can meet the requirements of optical performance as seen in FIGS. 2A-2D.

Figure 2A:
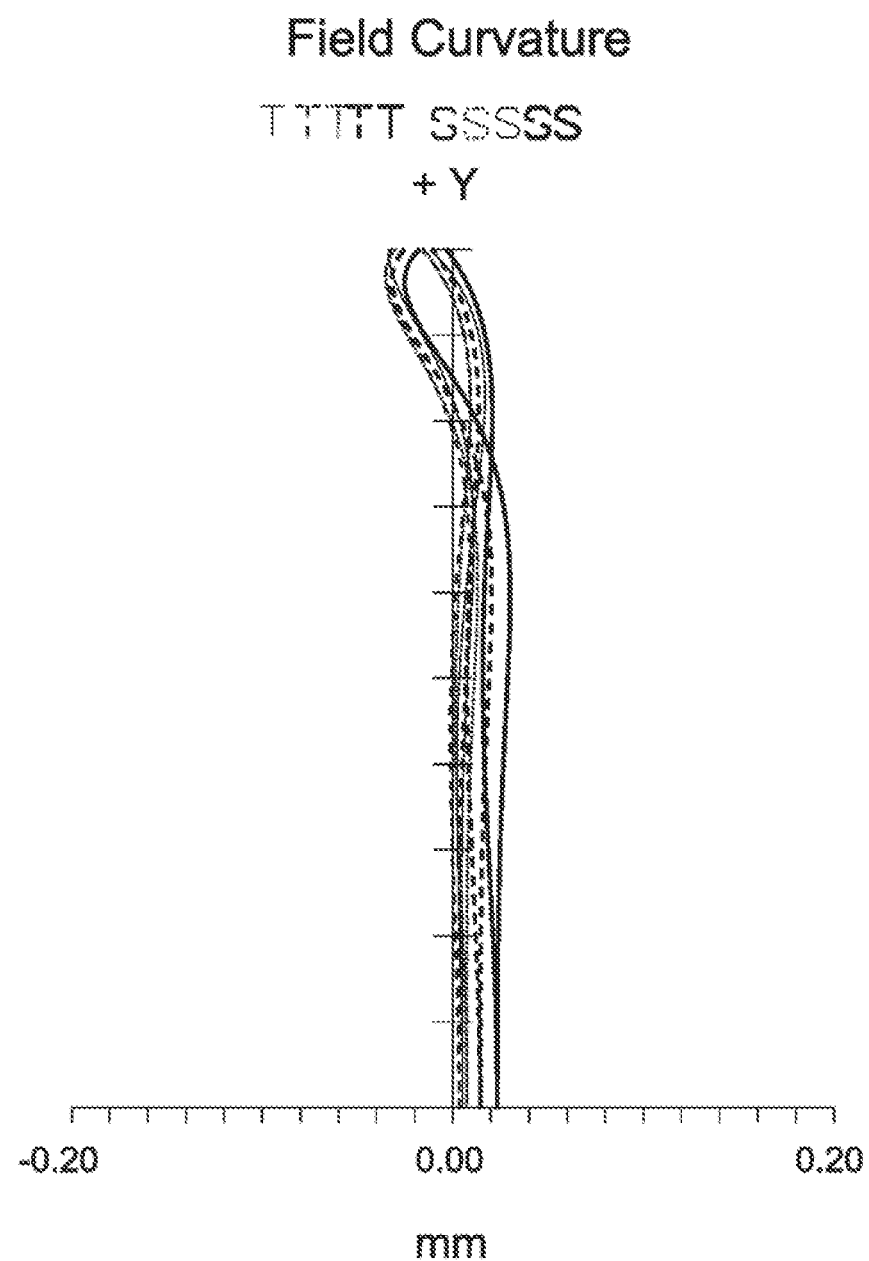
FIG. 2A depicts a field curvature diagram of the wide-angle lens assembly in accordance with the first embodiment of the invention.
Figure 2B:
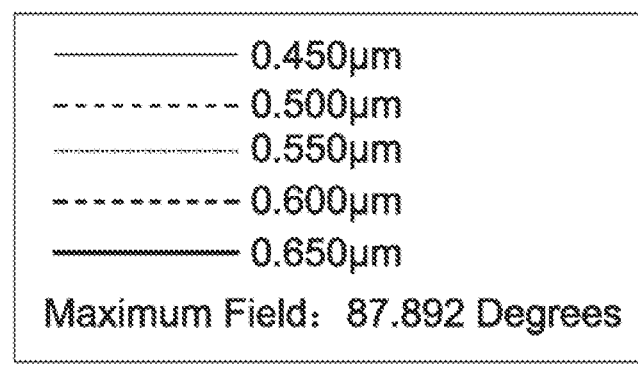
FIG. 2B is a distortion diagram of the wide-angle lens assembly in accordance with the first embodiment of the invention.
Figure 2B:
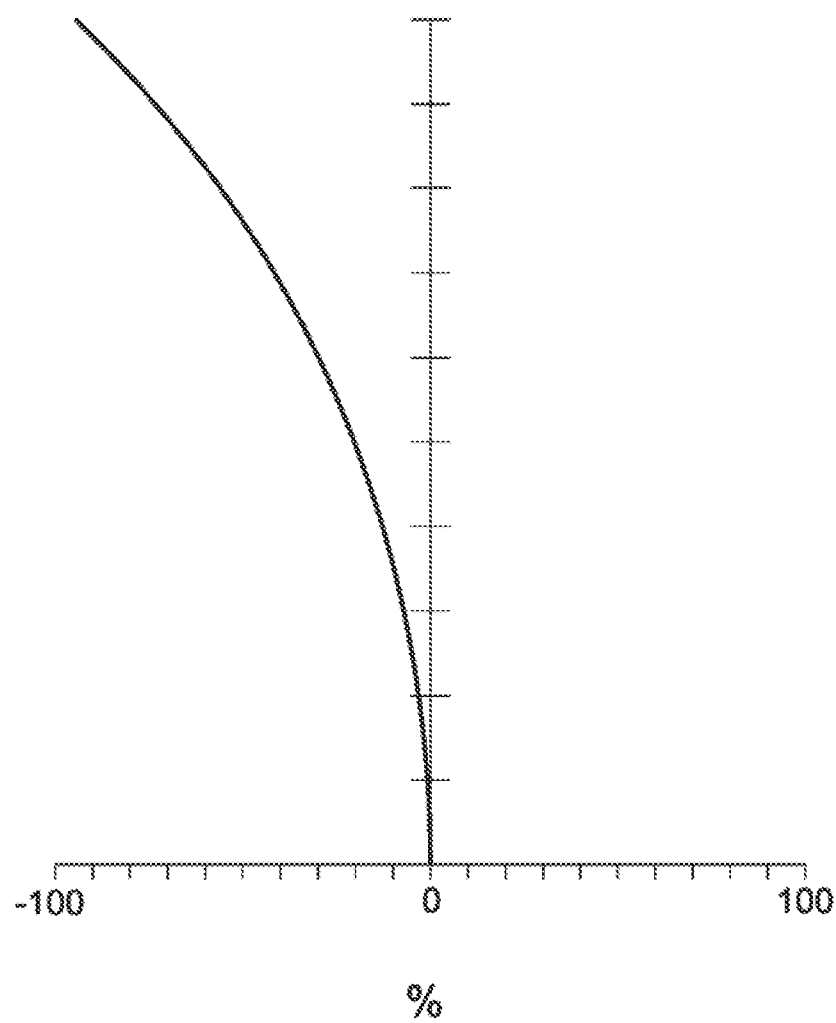
Figure 2C:
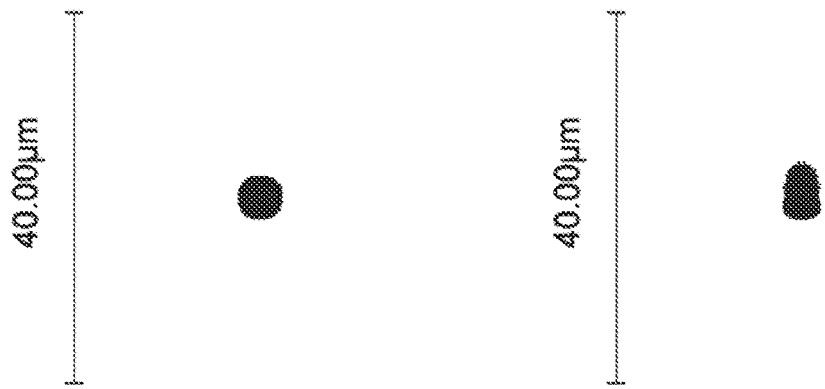
FIG. 2C is a spot diagram of the wide-angle lens assembly in accordance with the first embodiment of the invention.
Figure 2C:
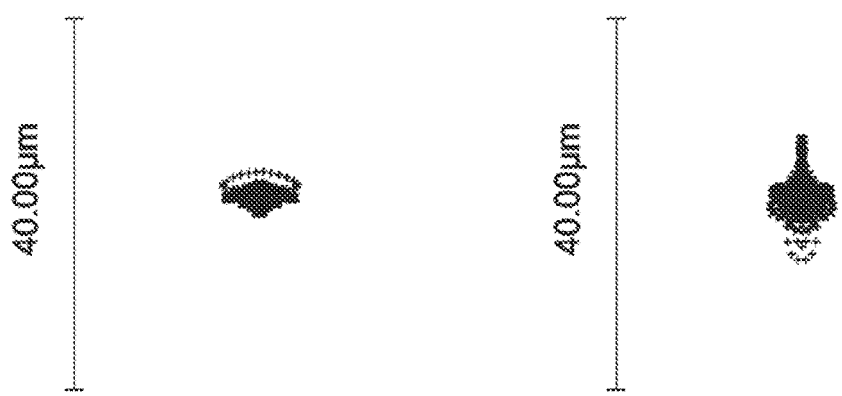
Figure 2D:
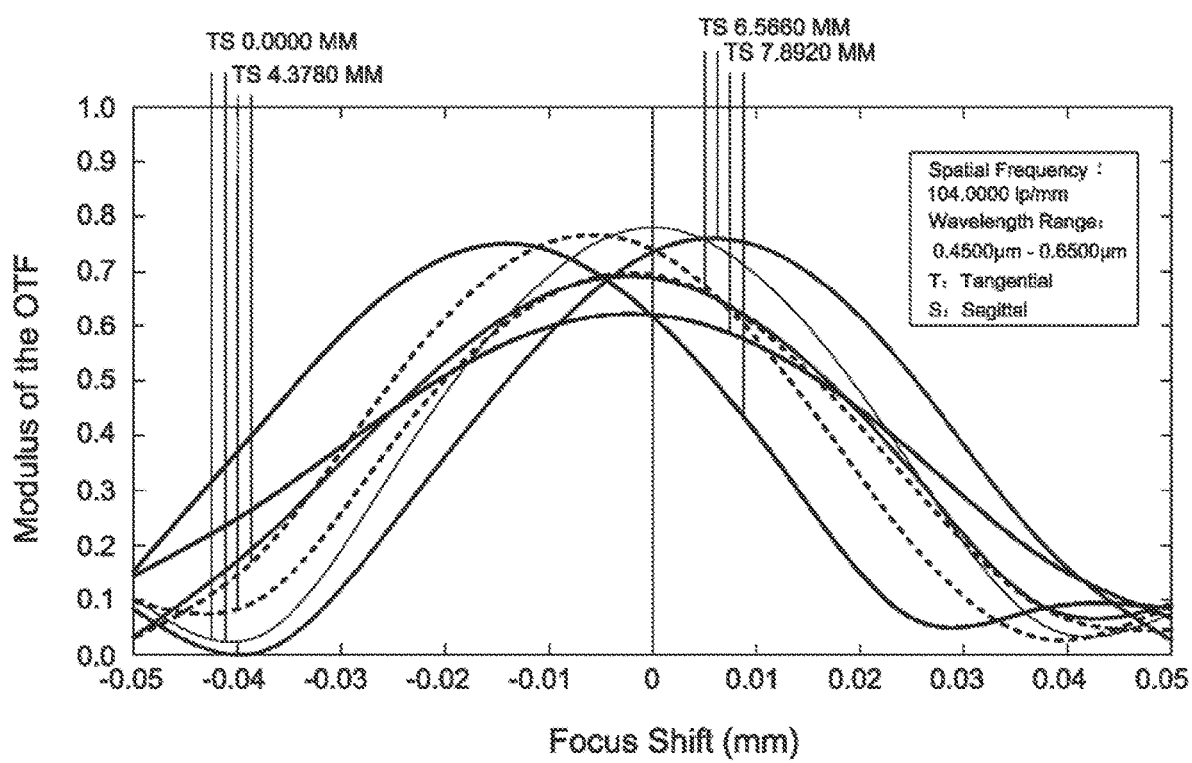
FIG. 2D is a through focus modulation transfer function diagram of the wide-angle lens assembly in accordance with the first embodiment of the invention.

It can be seen from FIG. 2A that the field curvature of tangential direction and sagittal direction in the wide-angle lens assembly 1 of the first embodiment ranges from −0.04 mm to 0.04 mm. It can be seen from FIG. 2B that the distortion in the wide-angle lens assembly 1 of the first embodiment ranges from −100% to 0%. It can be seen from FIG. 2C that the root mean square spot radius is equal to 0.883 μm and geometrical spot radius is equal to 1.857 μm as image height is equal to 0.000 mm, the root mean square spot radius is equal to 1.175 μm and geometrical spot radius is equal to 3.418 μm as image height is equal to 4.378 mm, the root mean square spot radius is equal to 1.422 μm and geometrical spot radius is equal to 4.517 μm as image height is equal to 6.566 mm, and the root mean square spot radius is equal to 2.135 μm and geometrical spot radius is equal to 6.950 m as image height is equal to 7.892 mm for the lens assembly 1 of the first embodiment. It can be seen from FIG. 2D that the through focus modulation transfer function of tangential direction and sagittal direction in the lens assembly 1 of the first embodiment ranges from 0.0 to 0.78 as focus shift ranges from −0.05 mm to 0.05 mm.

It is obvious that the field curvature and the distortion of the wide-angle lens assembly 1 of the first embodiment can be corrected effectively, and the resolution and the depth of focus of the wide-angle lens assembly 1 of the first embodiment can meet the requirement. Therefore, the wide-angle lens assembly 1 of the first embodiment is capable of good optical performance.

Referring to FIG. 3, FIG. 3 is a lens layout and optical path diagram of a wide-angle lens assembly in accordance with a second embodiment of the invention. The wide-angle lens assembly 2 includes a first lens L21, a second lens L22, a third lens L23, a fourth lens L24, a fifth lens L25, a sixth lens L26, a stop ST2, a seventh lens L27, an eighth lens L28, a ninth lens L29, a tenth lens L210, an optical filter OF2, and a cover glass CG2, all of which are arranged in order from an object side to an image side along an optical axis OA2. The eighth lens L28 is cemented by an eighth front lens L28$_F$ and an eighth rear lens L28$_R$. The ninth lens L29 is cemented by a ninth front lens L29$_F$ and a ninth rear lens L29$_R$. In operation, an image of light rays from the object side is formed at an image plane IMA2.

According to the foregoing paragraphs, wherein: the third lens is a plane-concave lens, wherein the image side surface S26 is a plane surface; the fifth lens is a biconvex lens, wherein the image side surface S210 is a convex surface and the image side surface S210 is a spherical surface; both of the object side surface S224 and image side surface S225 of the optical filter OF2 are plane surfaces; and both of the object side surface S226 and image side surface S227 of the cover glass CG2 are plane surfaces.

With the above design of the lenses and stop ST2 and at least any one of the conditions (1)-(4) satisfied, the wide-angle lens assembly 2 can have an effective increased field of view, an effective increased resolution, an effective resisted environmental temperature change, an effective corrected aberration, and is capable of an effective corrected chromatic aberration.

Table 3 shows the optical specification of the wide-angle lens assembly 2 in FIG. 3.

TABLE 3

Effective Focal Length = 5.186 mm F-number = 2.8
Total Lens Length = 79.99 mm Field of View = 88.55 degrees

| Surface Number | Radius of Curvature (mm) | Thickness (mm) | Nd | Vd | Effective Focal Length (mm) | Remark |
|---|---|---|---|---|---|---|
| S21 | 38.426 | 2.384 | 1.800 | 42.23 | −33.98 | The First Lens L21 |
| S22 | 15.598 | 8.148 | | | | |
| S23 | 46.212 | 1.467 | 1.743 | 49.34 | −18.77 | The Second Lens L22 |
| S24 | 10.667 | 10.748 | | | | |
| S25 | −13.032 | 1.392 | 1.692 | 54.57 | −18.63 | The Third Lens L23 |
| S26 | inf | 1.728 | | | | |
| S27 | −32.037 | 7.400 | 1.743 | 49.34 | 37.85 | The Fourth Lens L24 |
| S28 | −16.565 | 0.150 | | | | |
| S29 | 29.003 | 3.670 | 1.850 | 32.31 | 31.56 | The Fifth Lens L25 |
| S210 | −443.618 | 11.632 | | | | |
| S211 | 11.828 | 4.158 | 1.497 | 81.55 | 21.68 | The Sixth Lens L26 |
| S212 | −116.039 | 0.749 | | | | |
| S213 | ∞ | 1.120 | | | | Stop ST2 |
| S214 | 20.392 | 0.760 | 1.850 | 32.31 | −32.24 | The Seventh Lens L27 |
| S215 | 11.579 | 0.755 | | | | |
| S216 | 19.920 | 2.881 | 1.564 | 60.67 | 9.58 | The Eighth Lens L28 The Eighth Front Lens L28$_F$ |
| S217 | −7.121 | 0.753 | 1.847 | 23.79 | −10.58 | The Eighth Rear Lens L28$_R$ |
| S218 | −33.350 | 1.372 | | | | |
| S219 | −15.272 | 0.741 | 1.805 | 25.48 | −9.87 | The Ninth Lens L29 The Ninth Front Lens L29$_F$ |

TABLE 3-continued

Effective Focal Length = 5.186 mm F-number = 2.8
Total Lens Length = 79.99 mm Field of View = 88.55 degrees

| Surface Number | Radius of Curvature (mm) | Thickness (mm) | Nd | Vd | Effective Focal Length (mm) | Remark |
|---|---|---|---|---|---|---|
| S220 | 17.785 | 4.908 | 1.497 | 81.55 | 14.8 | The Ninth Rear Lens L29$_R$ |
| S221 | −11.529 | 0.524 | | | | |
| S222 | 20.429 | 4.384 | 1.923 | 18.90 | 18.65 | The Tenth Lens L210 |
| S223 | −121.253 | 3.820 | | | | |
| S224 | ∞ | 0.7 | 1.517 | 64.17 | | Optical Filter OF2 |
| S225 | ∞ | 1 | | | | |
| S226 | ∞ | 0.5 | 1.517 | 64.17 | | Cover Glass CG2 |
| S227 | ∞ | 2.144 | | | | |

Table 4 shows the parameters and condition values for conditions (1)-(4) in accordance with the second embodiment of the invention. It can be seen from Table 4 that the wide-angle lens assembly 2 of the second embodiment satisfies the conditions (1)-(4).

TABLE 4

| BFL | 8.164 mm | TTL/f | 15.42 | TTL/BFL | 9.80 |
|---|---|---|---|---|---|
| $f_4/f$ | 7.30 | $|f_7/f|$ | 6.22 | | |

By the above arrangements of the lenses and stop ST2, the wide-angle lens assembly 2 of the second embodiment can meet the requirements of optical performance as seen in FIGS. 4A-4D.

Figure 4A:
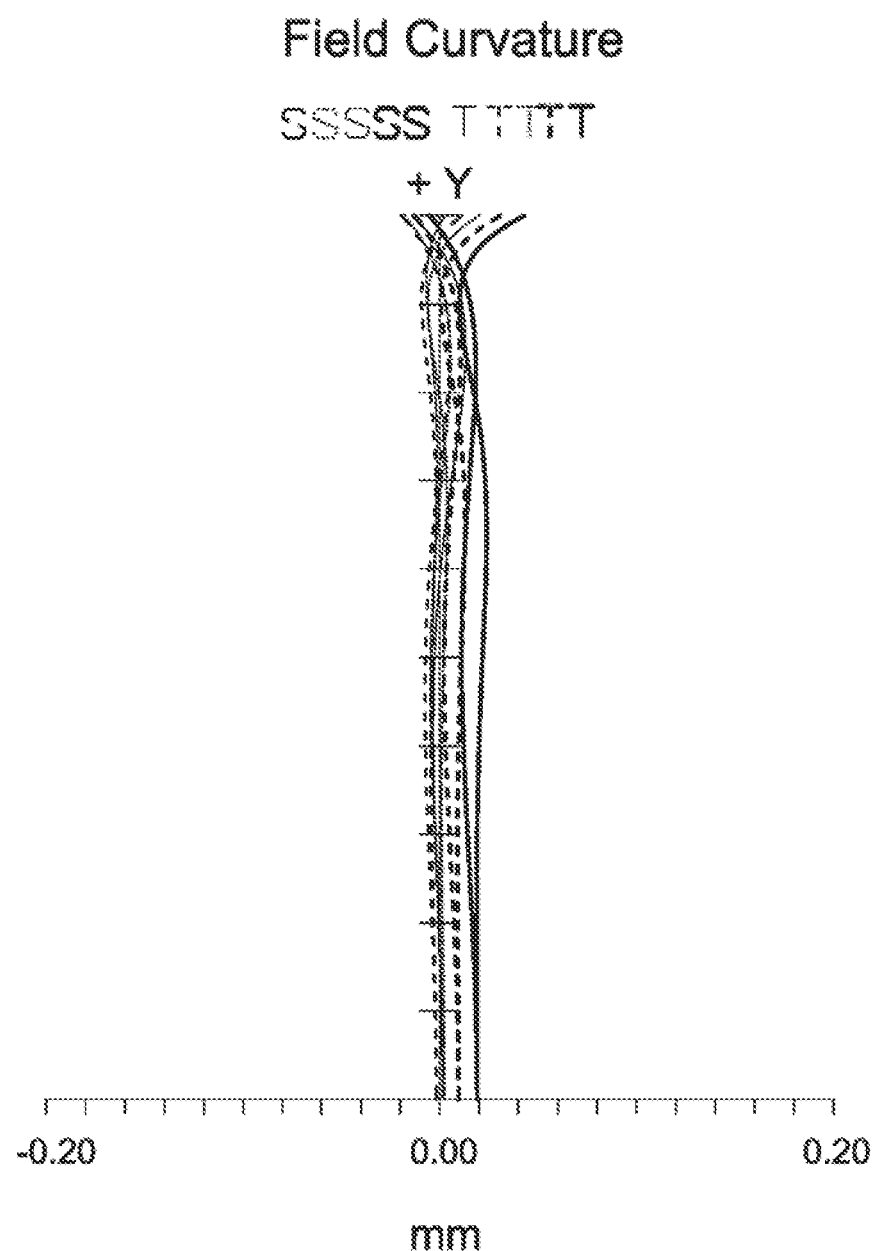
FIG. 4A depicts a field curvature diagram of the wide-angle lens assembly in accordance with the second embodiment of the invention.
Figure 4B:
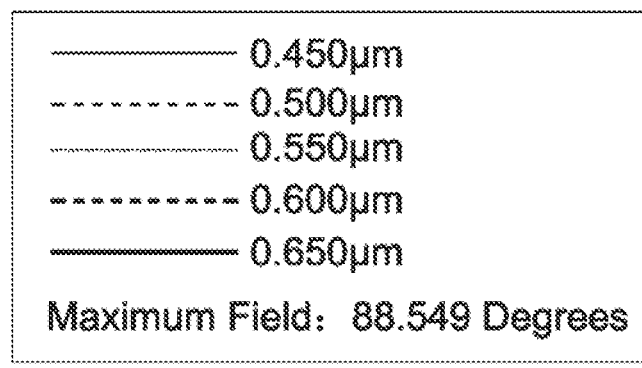
FIG. 4B is a distortion diagram of the wide-angle lens assembly in accordance with the second embodiment of the invention.
Figure 4B:
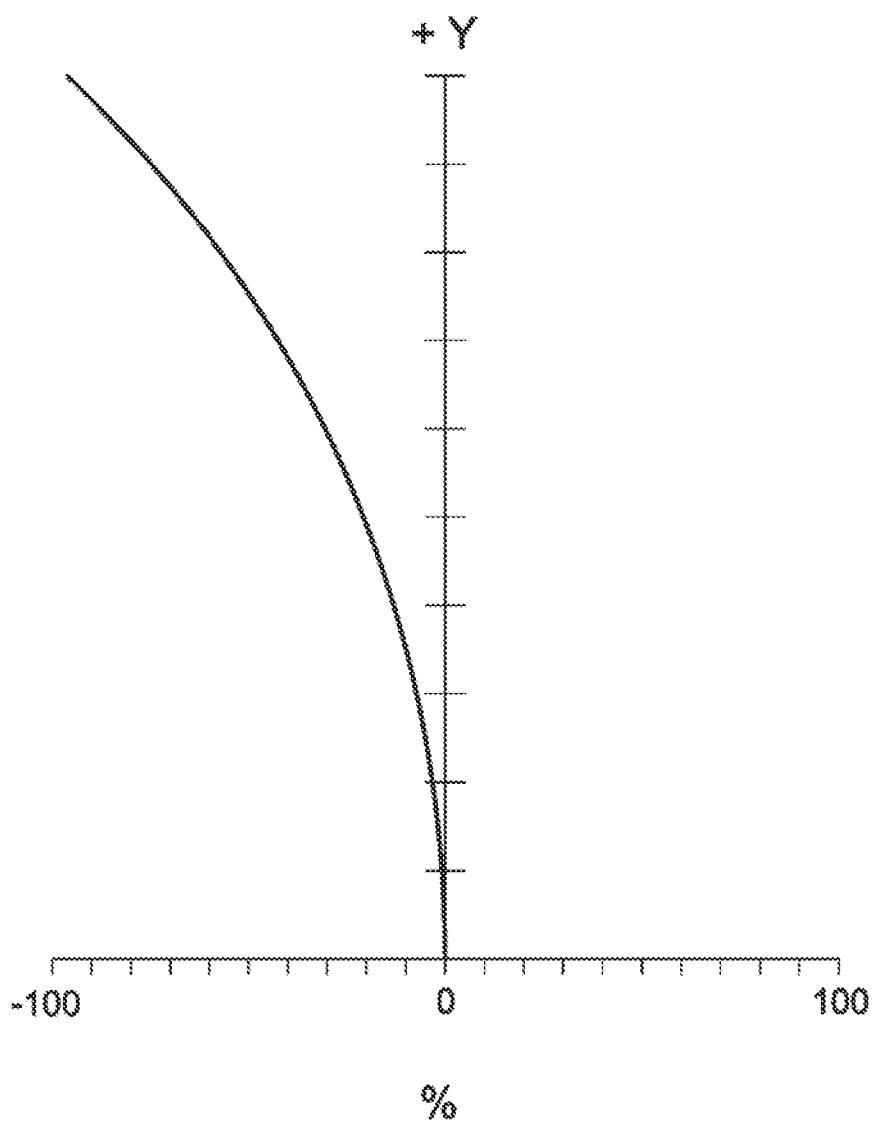
Figure 4C:
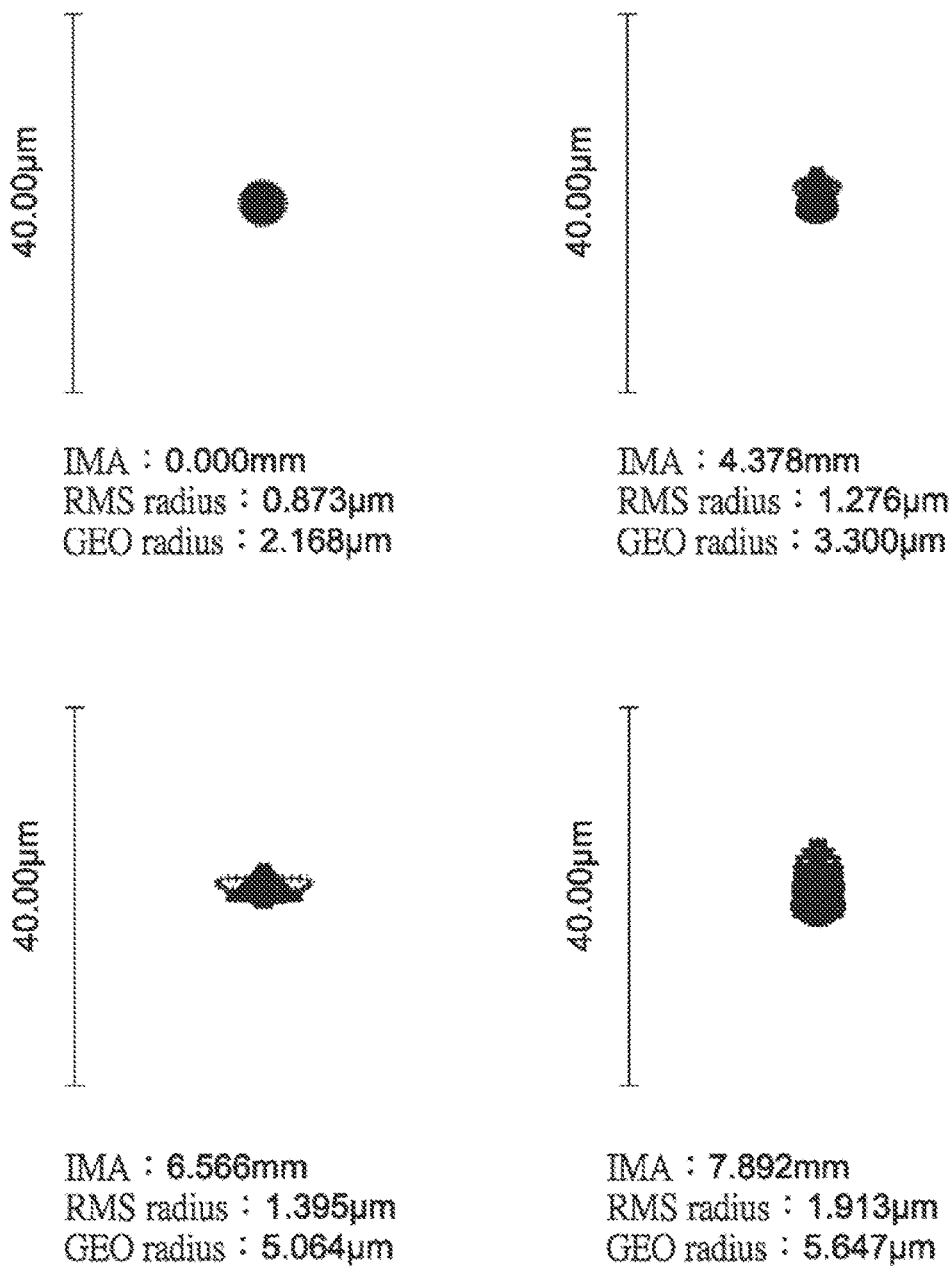
FIG. 4C is a spot diagram of the wide-angle lens assembly in accordance with the second embodiment of the invention.
Figure 4D:
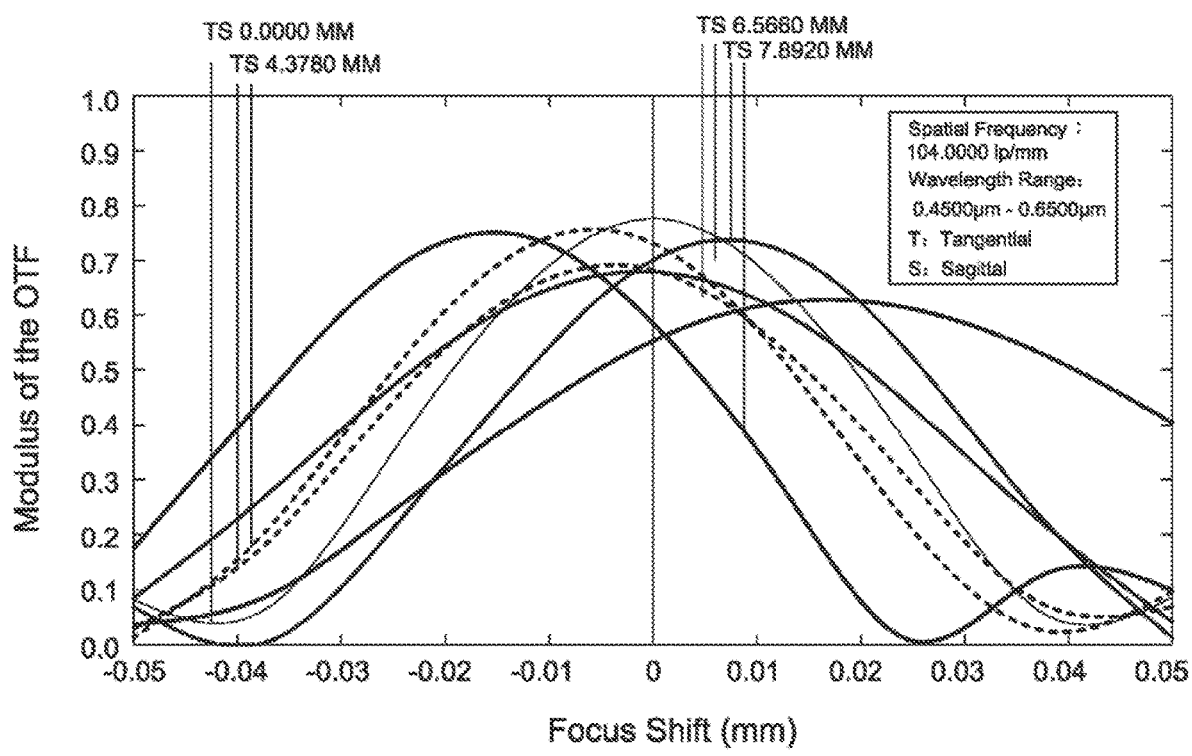
FIG. 4D is a through focus modulation transfer function diagram of the wide-angle lens assembly in accordance with the second embodiment of the invention.

It can be seen from FIG. 4A that the field curvature of tangential direction and sagittal direction in the wide-angle lens assembly 2 of the second embodiment ranges from −0.04 mm to 0.04 mm. It can be seen from FIG. 4B that the distortion in the wide-angle lens assembly 2 of the second embodiment ranges from −100% to 0%. It can be seen from FIG. 4C that the root mean square spot radius is equal to 0.873 μm and geometrical spot radius is equal to 2.168 μm as image height is equal to 0.000 mm, the root mean square spot radius is equal to 1.276 μm and geometrical spot radius is equal to 3.300 μm as image height is equal to 4.378 mm, the root mean square spot radius is equal to 1.395 μm and geometrical spot radius is equal to 5.064 μm as image height is equal to 6.566 mm, and the root mean square spot radius is equal to 1.913 μm and geometrical spot radius is equal to 5.647 μm as image height is equal to 7.892 mm for the lens assembly 2 of the second embodiment. It can be seen from FIG. 4D that the through focus modulation transfer function of tangential direction and sagittal direction in the lens assembly 2 of the second embodiment ranges from 0.0 to 0.78 as focus shift ranges from −0.05 mm to 0.05 mm.

It is obvious that the field curvature and the distortion of the wide-angle lens assembly 2 of the second embodiment can be corrected effectively, and the resolution and the depth of focus of the wide-angle lens assembly 2 of the second embodiment can meet the requirement. Therefore, the wide-angle lens assembly 2 of the second embodiment is capable of good optical performance.

Referring to FIG. 5, FIG. 5 is a lens layout and optical path diagram of a wide-angle lens assembly in accordance with a third embodiment of the invention. The wide-angle lens assembly 3 includes a first lens L31, a second lens L32, a third lens L33, a fourth lens L34, a fifth lens L35, a sixth lens L36, a stop ST3, a seventh lens L37, an eighth lens L38, a ninth lens L39, a tenth lens L310, an optical filter OF3, and a cover glass CG3, all of which are arranged in order from an object side to an image side along an optical axis OA3. The eighth lens L38 is cemented by an eighth front lens L38$_F$ and an eighth rear lens L38$_R$. The ninth lens L39 is cemented by a ninth front lens L39$_F$ and a ninth rear lens L39$_R$. In operation, an image of light rays from the object side is formed at an image plane IMA3.

According to the foregoing paragraphs, wherein: the third lens is a biconcave lens, wherein the image side surface S36 is a concave surface and the image side surface S36 is a spherical surface; the fifth lens is a meniscus lens, wherein the image side surface S310 is a concave surface and the image side surface S310 is a spherical surface; both of the object side surface S324 and image side surface S325 of the optical filter OF3 are plane surfaces; and both of the object side surface S326 and image side surface S327 of the cover glass CG3 are plane surfaces.

With the above design of the lenses and stop ST3 and at least any one of the conditions (1)-(4) satisfied, the wide-angle lens assembly 3 can have an effective increased field of view, an effective increased resolution, an effective resisted environmental temperature change, an effective corrected aberration, and is capable of an effective corrected chromatic aberration.

Table 5 shows the optical specification of the wide-angle lens assembly 3 in FIG. 5.

TABLE 5

Effective Focal Length = 5.183 mm F-number = 2.8
Total Lens Length = 80 mm Field of View = 88.47 degrees

| Surface Number | Radius of Curvature (mm) | Thickness (mm) | Nd | Vd | Effective Focal Length (mm) | Remark |
|---|---|---|---|---|---|---|
| S31 | 40.421 | 3.882 | 1.79 | 47.37 | −36.75 | The First Lens L31 |
| S32 | 16.268 | 7.270 | | | | |

TABLE 5-continued

Effective Focal Length = 5.183 mm F-number = 2.8
Total Lens Length = 80 mm Field of View = 88.47 degrees

| Surface Number | Radius of Curvature (mm) | Thickness (mm) | Nd | Vd | Effective Focal Length (mm) | Remark |
|---|---|---|---|---|---|---|
| S33 | 37.136 | 1.301 | 1.74 | 49.34 | −19.79 | The Second Lens L32 |
| S34 | 10.465 | 11.502 | | | | |
| S35 | −13.829 | 1.437 | 1.69 | 54.57 | −16.78 | The Third Lens L33 |
| S36 | 80.937 | 2.220 | | | | |
| S37 | −40.377 | 8.092 | 1.74 | 49.34 | 34.45 | The Fourth Lens L34 |
| S38 | −17.136 | 0.150 | | | | |
| S39 | 23.949 | 3.850 | 1.85 | 32.31 | 31.82 | The Fifth Lens L35 |
| S310 | 169.847 | 10.259 | | | | |
| S311 | 11.963 | 3.966 | 1.50 | 81.55 | 21.25 | The Sixth Lens L36 |
| S312 | −85.582 | 0.252 | | | | |
| S313 | ∞ | 1.173 | | | | Stop ST3 |
| S314 | 19.556 | 0.795 | 1.85 | 32.31 | −34.22 | The Seventh Lens L37 |
| S315 | 11.557 | 0.784 | | | | |
| S316 | 20.300 | 2.613 | 1.56 | 60.67 | 9.84 | The Eighth Lens L38 The Eighth Front Lens L38$_F$ |
| S317 | −7.378 | 0.746 | 1.85 | 23.79 | −11.25 | The Eighth Rear Lens L38$_R$ |
| S318 | −31.604 | 1.250 | | | | |
| S319 | −13.395 | 0.682 | 1.81 | 25.48 | −8.83 | The Ninth Lens L39 The Ninth Front Lens L39$_F$ |
| S320 | 16.284 | 4.248 | 1.50 | 81.55 | 14.16 | The Ninth Rear Lens L39$_R$ |
| S321 | −11.452 | 1.258 | | | | |
| S322 | 23.066 | 4.466 | 1.92 | 18.90 | 17.58 | The Tenth Lens L310 |
| S323 | −55.207 | 3.902 | | | | |
| S324 | ∞ | 0.7 | 1.52 | 64.17 | | Optical Filter OF3 |
| S325 | ∞ | 1 | | | | |
| S326 | ∞ | 0.5 | 1.52 | 64.17 | | Cover Glass CG3 |
| S327 | ∞ | 1.7 | | | | |

Table 6 shows the parameters and condition values for conditions (1)-(4) in accordance with the third embodiment of the invention. It can be seen from Table 6 that the wide-angle lens assembly 3 of the third embodiment satisfies the conditions

TABLE 6

| BFL | 7.802 mm | TTL/f | 15.44 | TTL/BFL | 10.25 |
|---|---|---|---|---|---|
| f$_4$/f | 6.65 | |f$_7$/f| | 6.60 | | |

By the above arrangements of the lenses and stop ST3, the wide-angle lens assembly 3 of the third embodiment can meet the requirements of optical performance as seen in FIGS. 6A-6D.

Figure 6A:
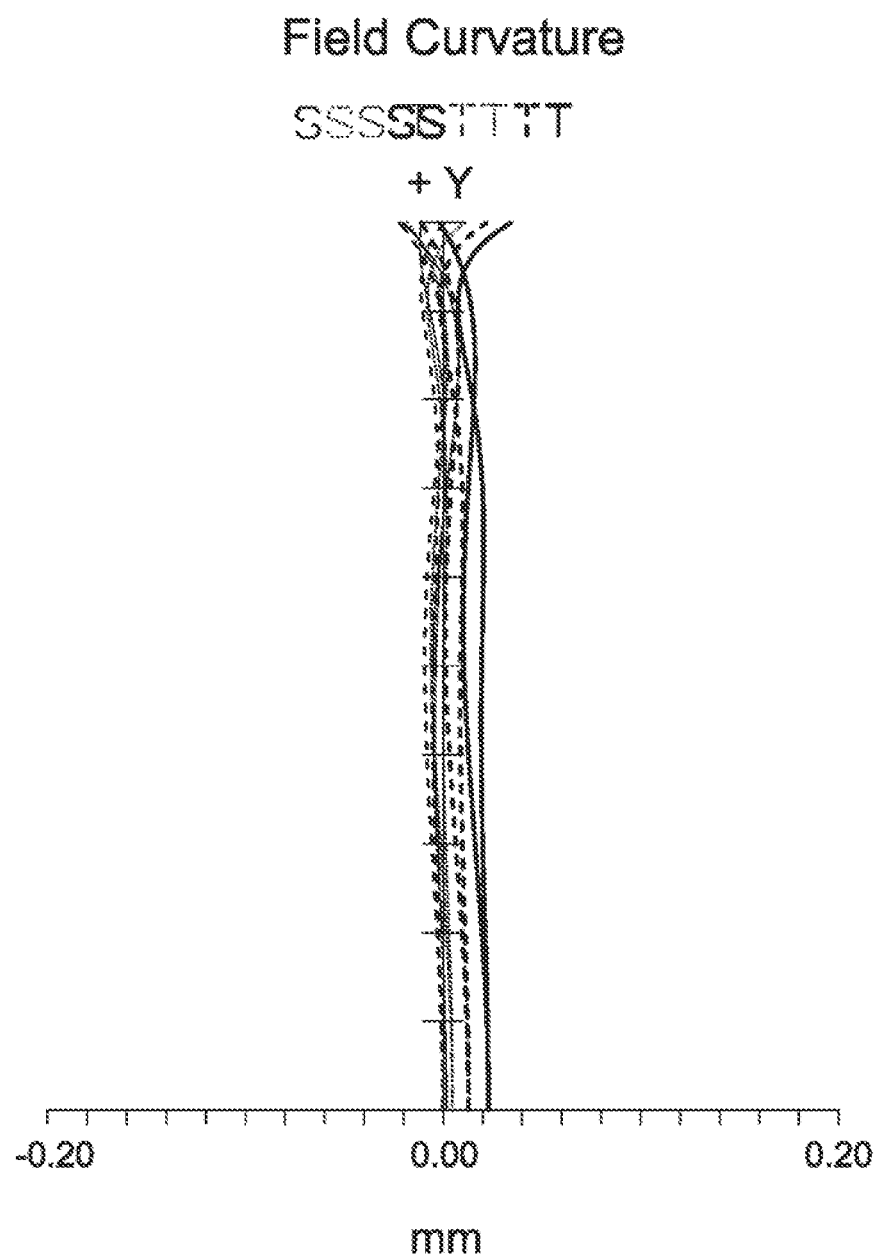
FIG. 6A depicts a field curvature diagram of the wide-angle lens assembly in accordance with the third embodiment of the invention.
Figure 6B:
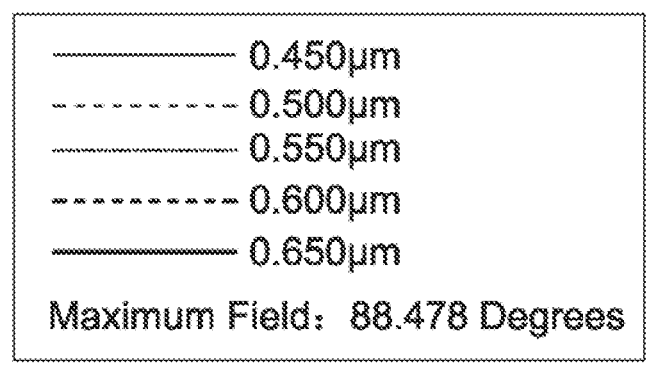
FIG. 6B is a distortion diagram of the wide-angle lens assembly in accordance with the third embodiment of the invention.
Figure 6B:
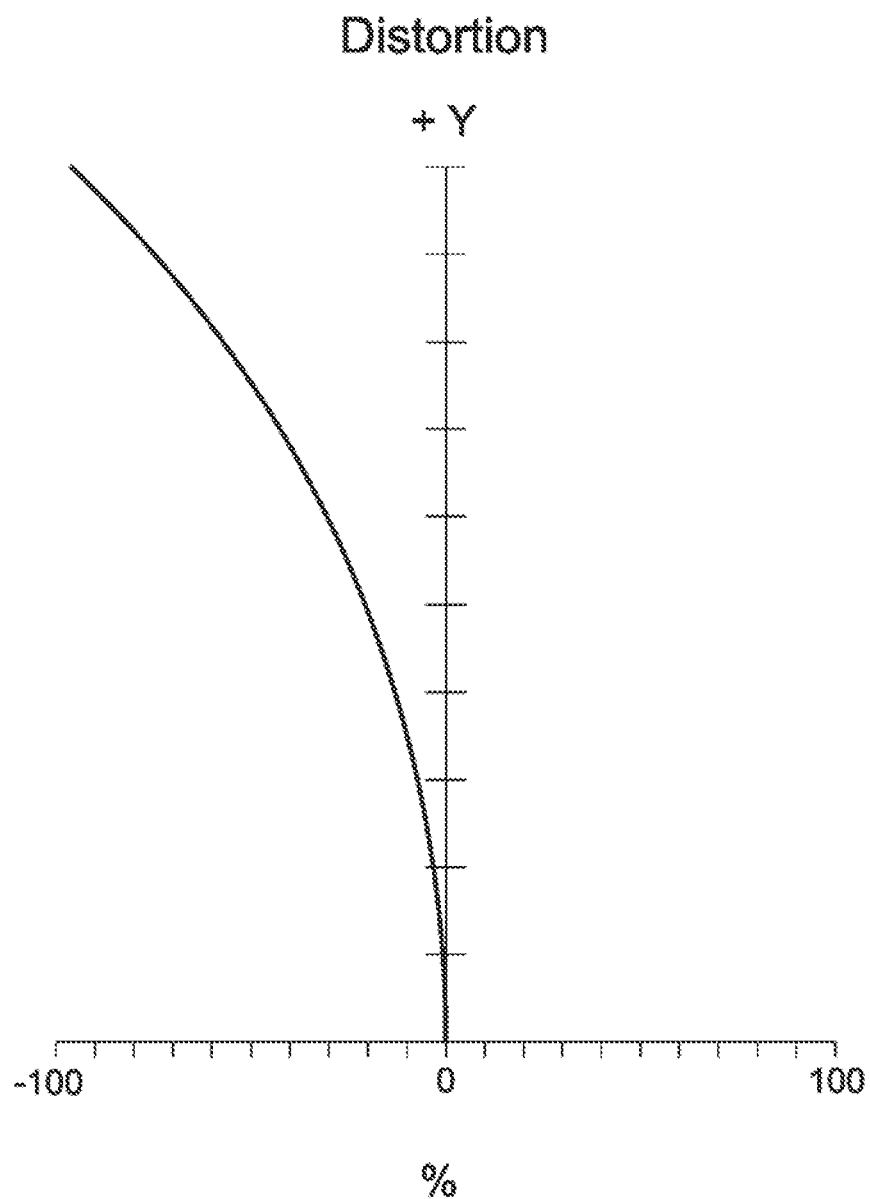
Figure 6C:
FIG. 6C is a spot diagram of the wide-angle lens assembly in accordance with the third embodiment of the invention.
Figure 6C:
Figure 6C:
Figure 6C:
Figure 6C:
Figure 6C:
Figure 6C:
Figure 6C:
Figure 6D:
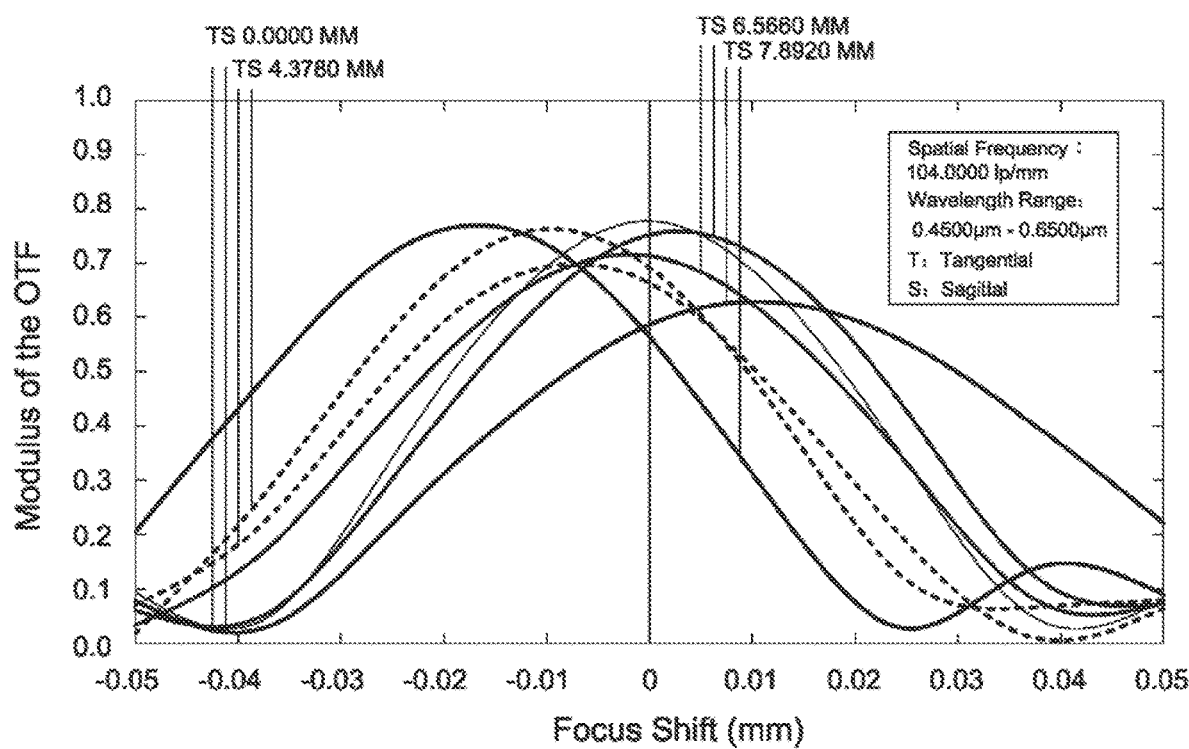
FIG. 6D is a through focus modulation transfer function diagram of the wide-angle lens assembly in accordance with the third embodiment of the invention.

It can be seen from FIG. 6A that the field curvature of tangential direction and sagittal direction in the wide-angle lens assembly 3 of the third embodiment ranges from −0.02 mm to 0.04 mm. It can be seen from FIG. 6B that the distortion in the wide-angle lens assembly 3 of the third embodiment ranges from −100% to 0%. It can be seen from FIG. 6C that the root mean square spot radius is equal to 0.763 μm and geometrical spot radius is equal to 1.397 μm as image height is equal to 0.000 mm, the root mean square spot radius is equal to 1.737 μm and geometrical spot radius is equal to 4.570 μm as image height is equal to 4.378 mm, the root mean square spot radius is equal to 1.199 μm and geometrical spot radius is equal to 4.222 μm as image height is equal to 6.566 mm, and the root mean square spot radius is equal to 2.042 μm and geometrical spot radius is equal to 5.491 μm as image height is equal to 7.892 mm for the lens assembly 3 of the third embodiment. It can be seen from FIG. 6D that the through focus modulation transfer function of tangential direction and sagittal direction in the lens assembly 3 of the third embodiment ranges from 0.0 to 0.78 as focus shift ranges from −0.05 mm to 0.05 mm.

It is obvious that the field curvature and the distortion of the wide-angle lens assembly 3 of the third embodiment can be corrected effectively, and the resolution and the depth of focus of the wide-angle lens assembly 3 of the third embodiment can meet the requirement. Therefore, the wide-angle lens assembly 3 of the third embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wide-angle lens assembly comprising:
   a first lens which is a meniscus lens with negative refractive power;
   a second lens which is a meniscus lens with negative refractive power;
   a third lens which is with negative refractive power;
   a fourth lens which is a meniscus lens with positive refractive power;
   a fifth lens which is with refractive power and comprises a convex surface facing an object side;
   a sixth lens which is with positive refractive power;
   a seventh lens which is with negative refractive power;

an eighth lens which is with refractive power and comprises a convex surface facing the object side;

a ninth lens which is with refractive power and comprises a concave surface facing the object side and a convex surface facing an image side; and a tenth lens which is with positive refractive power;

wherein the first lens, the second lens, the third lens, the fourth lens, the fifth lens, the sixth lens, the seventh lens, the eighth lens, the ninth lens, and the tenth lens are arranged in order from the object side to the image side along an optical axis.

2. The wide-angle lens assembly as claimed in claim 1, wherein the eighth lens is with positive refractive power and is composed of a cemented lens of an eighth front lens and an eighth rear lens.

3. The wide-angle lens assembly as claimed in claim 2, wherein:

the eighth front lens is a biconvex lens with positive refractive power;

the eighth rear lens is a meniscus lens with negative refractive power and comprises a concave surface facing the object side and a convex surface facing the image side; and the eighth front lens and the eighth rear lens are arranged in order from the object side to the image side along the optical axis.

4. The wide-angle lens assembly as claimed in claim 3, wherein:

the first lens comprises a convex surface facing the object side and a concave surface facing the image side;

the third lens comprises a concave surface facing the object side and another concave surface facing the image side;

the fifth lens is with positive refractive power and further comprises a concave surface facing the image side;

the seventh lens comprises a convex surface facing the object side and a concave surface facing the image side;

the eighth lens is with positive refractive power;

the ninth lens is with negative refractive power; and the tenth lens comprises a convex surface facing the object side and another convex surface facing the image side.

5. The wide-angle lens assembly as claimed in claim 4, wherein the wide-angle lens assembly satisfies at least one of the following conditions:

$14.5 \leq TTL/f \leq 16.5$;

$9 \leq TTL/BFL \leq 11$;

$6 \leq f_4/f \leq 8$;

$6 \leq |f_7/f| \leq 8$;

wherein TTL is an interval from an object side surface of the first lens to an image plane along the optical axis, BFL is an interval from an image side surface of the tenth lens to the image plane along the optical axis, f is an effective focal length of the wide-angle lens assembly, $f_4$ is an effective focal length of the fourth lens, and $f_7$ is an effective focal length of the seventh lens.

6. The wide-angle lens assembly as claimed in claim 1, wherein the ninth lens is with negative refractive power and is composed of a cemented lens of a ninth front lens and a ninth rear lens.

7. The wide-angle lens assembly as claimed in claim 6, wherein:

the ninth front lens is a biconcave lens with negative refractive power;

the ninth rear lens is a biconvex lens with positive refractive power; and the ninth front lens and the ninth rear lens are arranged in order from the object side to the image side along the optical axis.

8. The wide-angle lens assembly as claimed in claim 7, wherein:

the first lens comprises a convex surface facing the object side and a concave surface facing the image side;

the second lens comprises a convex surface facing the object side and a concave surface facing the image side;

the third lens comprises a concave surface facing the object side and a plane surface facing the image side;

the fourth lens comprises a concave surface facing the object side and a convex surface facing the image side;

the fifth lens further comprises a convex surface facing the image side;

the sixth lens comprises a convex surface facing the object side and another convex surface facing the image side;

the seventh lens comprises a convex surface facing the object side and a concave surface facing the image side;

the eighth lens further comprises a convex surface facing the image side; and the tenth lens comprises a convex surface facing the object side and another convex surface facing the image side.

9. The wide-angle lens assembly as claimed in claim 1, wherein the third lens comprises a concave surface facing the object side and another concave surface facing the image side and the fifth lens further comprises a concave surface facing the image side.

10. The wide-angle lens assembly as claimed in claim 1, wherein the third lens comprises a concave surface facing the object side and a plane surface facing the image side and the fifth lens further comprises a convex surface facing the image side.

11. The wide-angle lens assembly as claimed in claim 1, wherein:

the first lens comprises a convex surface facing the object side and a concave surface facing the image side;

the seventh lens comprises a convex surface facing the object side and a concave surface facing the image side; and the tenth lens comprises a convex surface facing the object side and another convex surface facing the image side.

12. The wide-angle lens assembly as claimed in claim 1, wherein:

the second lens comprises a convex surface facing the object side and a concave surface facing the image side;

the fourth lens comprises a concave surface facing the object side and a convex surface facing the image side;

the sixth lens comprises a convex surface facing the object side and another convex surface facing the image side; and the eighth lens further comprises a convex surface facing the image side.

13. The wide-angle lens assembly as claimed in claim 1, wherein:

the fifth lens is with positive refractive power;

the eighth lens is with positive refractive power; and the ninth lens is with negative refractive power.

14. The wide-angle lens assembly as claimed in claim 1, wherein the wide-angle lens assembly satisfies at least one of the following conditions:

$$14.5 \leq TTL/f \leq 16.5;$$

$$9 \leq TTL/BFL \leq 11;$$

$$6 \leq f_4/f \leq 8;$$

$$6 \leq |f_7/f| \leq 8;$$

wherein TTL is an interval from an object side surface of the first lens to an image plane along the optical axis, BFL is an interval from an image side surface of the tenth lens to the image plane along the optical axis, f is an effective focal length of the wide-angle lens assembly, $f_4$ is an effective focal length of the fourth lens, and $f_7$ is an effective focal length of the seventh lens.

15. The wide-angle lens assembly as claimed in claim 1, further comprising a stop disposed between the sixth lens and the seventh lens.

16. A wide-angle lens assembly comprising:
a first lens which is a meniscus lens with negative refractive power;
a second lens which is a meniscus lens with negative refractive power;
a third lens which is with negative refractive power;
a fourth lens which is a meniscus lens with positive refractive power;
a fifth lens which is with refractive power and comprises a convex surface facing an object side;
a sixth lens which is with positive refractive power;
a seventh lens which is with refractive power and comprises a convex surface facing the object side and a concave surface facing an image side;
an eighth lens which is with refractive power and comprises a convex surface facing the object side;
a ninth lens which is with refractive power and comprises a concave surface facing the object side and a convex surface facing the image side; and
a tenth lens which is with positive refractive power;
wherein the first lens, the second lens, the third lens, the fourth lens, the fifth lens, the sixth lens, the seventh lens, the eighth lens, the ninth lens, and the tenth lens are arranged in order from the object side to the image side along an optical axis;
wherein an air gap is disposed between the third lens and the fourth lens.

17. The wide-angle lens assembly as claimed in claim 16, further comprising a stop disposed between the sixth lens and the seventh lens and satisfying at least one of the following conditions:

$$14.5 \leq TTL/f \leq 16.5;$$

$$9 \leq TTL/BFL \leq 11;$$

$$6 \leq f_4/f \leq 8;$$

$$6 \leq |f_7/f| \leq 8;$$

wherein TTL is an interval from an object side surface of the first lens to an image plane along the optical axis, BFL is an interval from an image side surface of the tenth lens to the image plane along the optical axis, f is an effective focal length of the wide-angle lens assembly, $f_4$ is an effective focal length of the fourth lens, and $f_7$ is an effective focal length of the seventh lens.

* * * * *